United States Patent [19]

Goostrey

[11] Patent Number: 5,741,111
[45] Date of Patent: Apr. 21, 1998

[54] ELECTRO-PNEUMATIC MACHINING JIG

[76] Inventor: Steven Edward Goostrey, 13 Emu Creek Road, Crows Nest, QLD 4353, Australia

[21] Appl. No.: 632,499

[22] PCT Filed: Oct. 19, 1994

[86] PCT No.: PCT/AU94/00642

§ 371 Date: Jun. 10, 1996

§ 102(e) Date: Jun. 10, 1996

[87] PCT Pub. No.: WO95/11103

PCT Pub. Date: Apr. 27, 1995

[30] Foreign Application Priority Data

Oct. 19, 1993 [AU] Australia ............... PM 1898
May 11, 1994 [AU] Australia ............... PM 5552
May 13, 1994 [AU] Australia ............... PM 5628

[51] Int. Cl.$^6$ ............................ B23Q 3/06
[52] U.S. Cl. ............. 414/676; 269/81; 269/126; 269/138
[58] Field of Search ............. 269/9, 55, 81, 269/104, 126, 138; 414/676

[56] References Cited

U.S. PATENT DOCUMENTS

| | | | |
|---|---|---|---|
| 2,622,457 | 12/1952 | Buck | 77/6 |
| 3,491,995 | 1/1970 | Taraba | 269/8 |
| 3,895,789 | 7/1975 | Mengeringhausen et al. | 269/55 X |
| 4,719,705 | 1/1988 | Laganza et al. | 269/55 X |

FOREIGN PATENT DOCUMENTS

| | | | |
|---|---|---|---|
| 443 831 | 8/1991 | European Pat. Off. | 269/55 |
| 0566770 | 10/1993 | European Pat. Off. | |
| 1161519 | 1/1964 | Germany. | |
| 1 172 618 | 6/1964 | Germany | 269/55 |
| 4022607 | 1/1992 | Germany. | |
| 1-316 181 | 12/1989 | Japan | 269/55 |
| 753249 | 7/1956 | United Kingdom. | |

*Primary Examiner*—Janice L. Krizek
*Attorney, Agent, or Firm*—Abelman, Frayne & Schwab

[57] ABSTRACT

An electro-pneumatic machining jig is adapted to be attached to the bed of a machine such as a milling machine, grinding machine or the like. The jig holds a workpiece, such as a cylinder head, for machining in a desired position relative to a tool head. The machining jig has a pair of jig stands (10) for clamping the workpiece therebetween, with the jig stands (10) mounted in selected spaced relationship on the bed of the machine. Each jig stand (10) has a workpiece connection means (22, 25) mounted on an adjustable stand (16, 17, 18). The stand is supported on a base (11, 12) which includes air-float means (54, 55, 50) and electromagnetic means (13, 53). The air-float means (54, 55, 56) permits alignment of the clamped workpiece relative to the tool head whilst the bases of the pair of jig stands (10) are floating. When the air-float is terminated, the electromagnetic means (13, 53) are energized to clamp each jig stand (10) to a mounting plate on the machine.

9 Claims, 5 Drawing Sheets

ELECTRO-PNEUMATIC MACHINING JIG

FIELD OF INVENTION

This invention relates to jigs for supporting work-pieces and more particularly to an adjustable electro-pneumatic machining jig.

BACKGROUND ART

A variety of devices have been used to hold work-pieces being machined in a generally horizontal plane. These prior art devices are limited in respect of the range, speed and accuracy of their adjustment.

SUMMARY OF THE INVENTION

According to one aspect of the invention there is provided an electro-pneumatic machining jig adapted to be attached to the bed of a machine such as a milling machine, grinding machine or the like, to hold a work-piece for machining, said machining jig having a pair of jig stands for holding the work-piece adapted to be mounted in selected spaced relationship on the bed of the machine, each said jig stand having work-piece connection means on an adjustable stand on a base having air-float means and electro-magnetic means, the arrangement being such that the air-float means permits alignment of the work-piece between the jig stands whilst the bases are floating and that when the air-float is terminated, the electro-magnetic means are energised to clamp each jig stand to a mounting plate on the machine. Preferably the air-float means comprises an air flow path within each base having an inlet that is adapted to be coupled to a source of pressurised air and an outlet directed to the mounting plate.

The electro-magnetic means may be in the form of an electro-magnetic coil embedded within the base.

The adjustable stand may include a shaft to which the work-piece is connected and means for rotating the shaft. Means may also be provided for raising and lowering the shaft with respect to the base.

BRIEF DESCRIPTION OF THE DRAWINGS

In order that the invention may be more readily understood and put into practical effect, reference will now be made to the accompanying drawings in which.

DESCRIPTION OF PREFERRED EMBODIMENT

Figure 1:
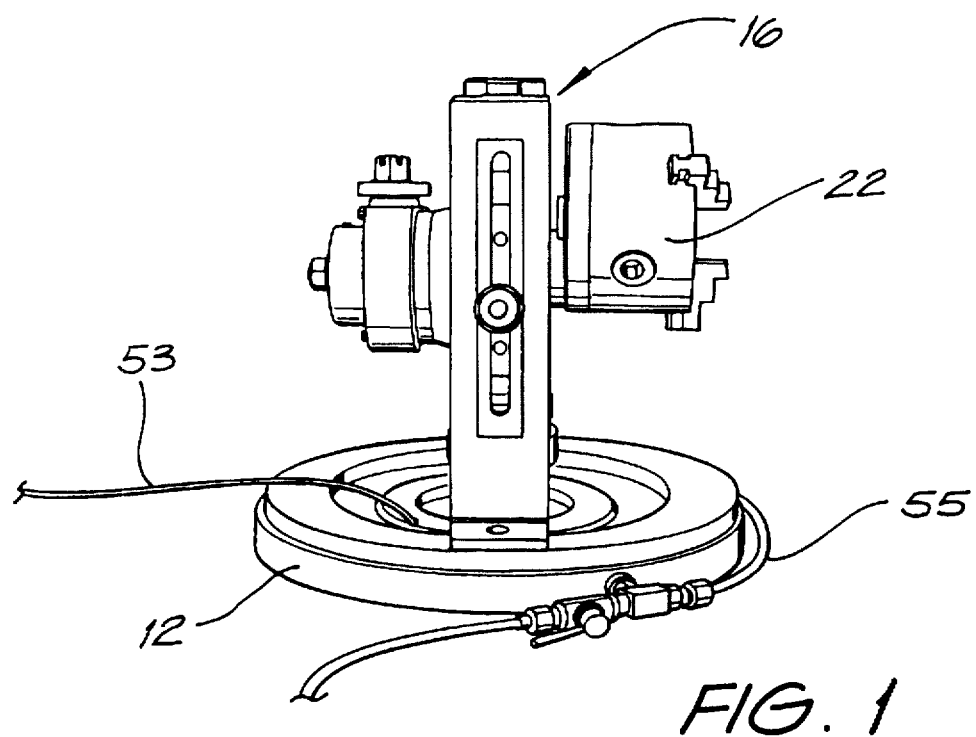
FIG. 1 is a perspective view of an electro-pneumatic machining jig according to the invention.

The electro-pneumatic machining jig shown in the drawings includes a pair of jig stands 10 each supported on a cast iron mounting plate 11, and having an air-float jig base 12 which incorporates an electro-magnetic coil 13 and spaced apart uprights 14 and 15 which constitute a housing stand 16 which carries means for adjustably supporting a work-piece.

Within the housing stand 16 there is a load bearing holder of housing 17 which supports a doubly truncated ball 18, preferably made of steel, through which projects shaft 19. The shaft 19 has an axial bore through which passes bolt 61 which secures chuck base plate 21 and lathe chuck 22 to the shaft 19. The chuck 22 is connected to the base plate 21 by screws 23 and roll pin 24. The chuck 22 has jaws 25 adapted to clamp a work-piece 26 (see FIG. 2).

Figure 5:
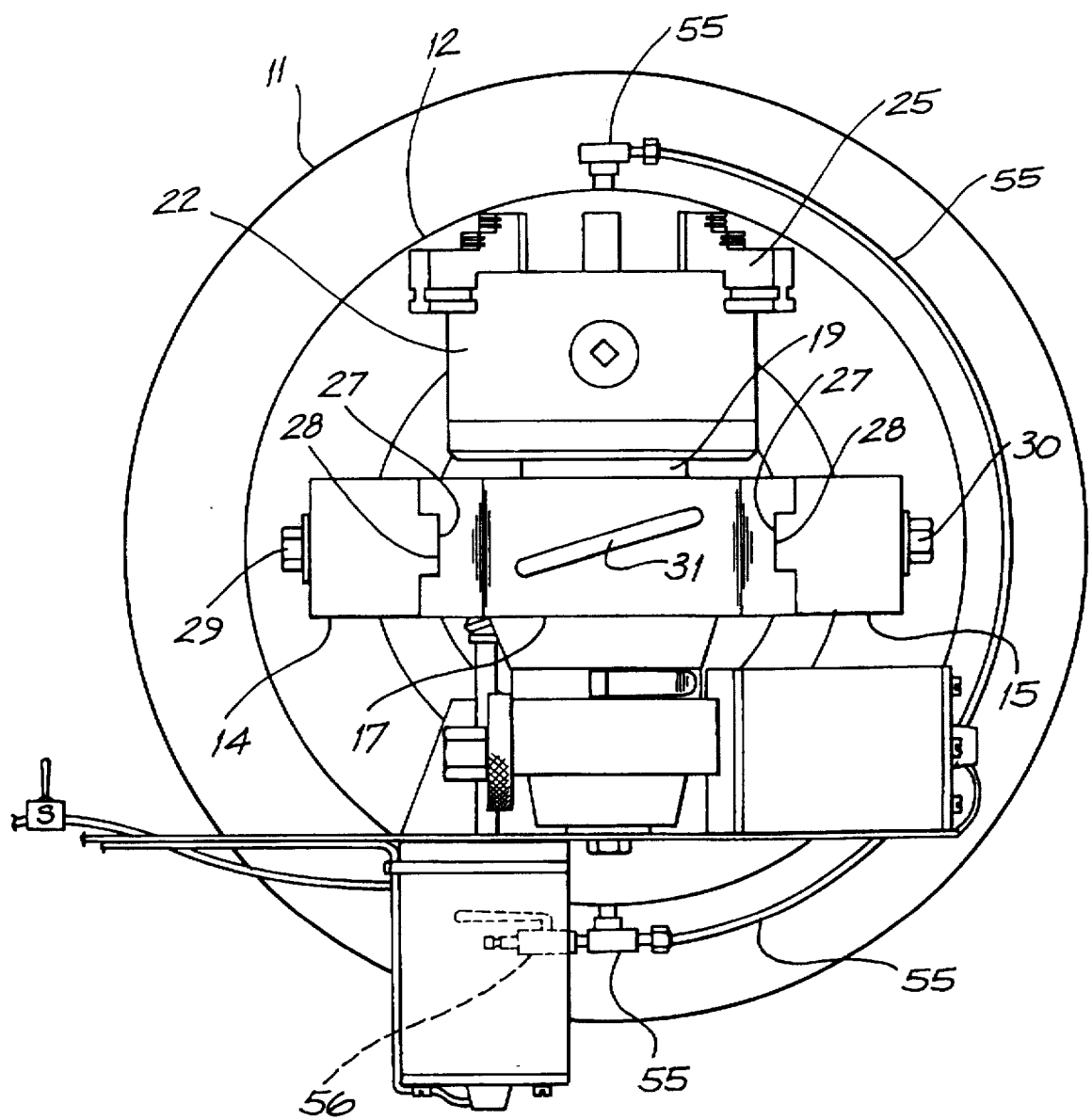
FIG. 5 is a plan view of the jig shown in FIG. 1.
Figure 6:
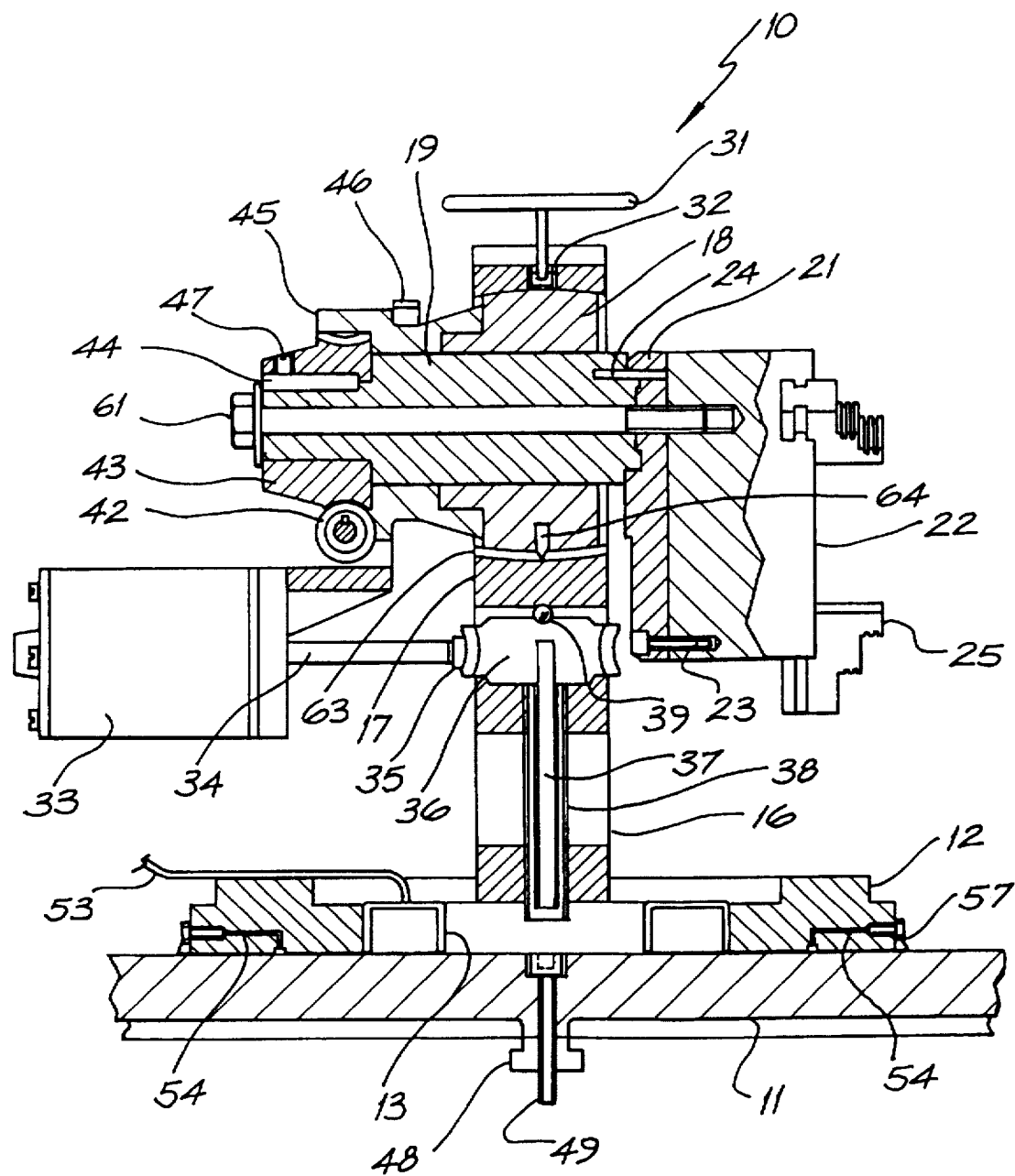
FIG. 6 is a cross-sectional view taken in the direction of arrows A—A in FIG. 4.

As can be seen in FIG. 5, each side of the housing 17 has a longitudinal recess 27 which receives the inwardly projecting keys 28 of the uprights 14 and 15. The housing 17 is clamped to the uprights 14 and 15 by studs and nuts 29 and 30. At the top of the housing 17 there is a bearing lock handle 31 retained by screw 32.

The housing 17 can be raised and lowered with respect to the housing stand 16 by operation of an electric motor 33 which has a drive shaft 34 that rotates height adjustment worm 35 which in turn rotates height adjustment worm gear 36 that is mounted on threaded jack bolt or shaft 37.

Jack bolt 37 is located within support 38 and has a threaded portion which threadably engages a threaded aperture formed in a cross-member securably mounted on the base 12.

Rotation of the worm gear 36 causes rotation of the jack bolt 37 within support 38 and because of its threaded engagement with the cross member, the jack bolt 37 is raised or lowered, thereby adjusting the height of the housing 17 which supports the doubly truncated steel ball 18.

Optionally, the threaded jack bolt may be operated manually through an adjusting wheel.

The housing 17 has a channel or slot 63 milled therethrough into which is engaged a detent spring and plunger 64 (not shown in detail) which is fitted on the doubly truncated steel ball 18. The engagement of the detent spring and plunger 64 with the channel 63 prevents the doubly truncated steel ball 18 from unnecessary twisting or rotating within the housing 17.

A ball bearing 39 is provided in a track between the worm gear 36 and the housing 17 to reduce friction between housing 17 and worm gear 36.

The shaft 19 can be rotated by means of electric motor 40 which has a drive shaft 41 that rotates angular adjustment worm 42 which in turn rotates angular adjustment gear 43 fixed to the shaft 19 by key 44. A worm gear housing 45 mounted on the doubly truncated steel ball 18 carries a cam lock 46 which can lock the shaft 19 against rotation. A grub screw 47 locks the worm gear 43 onto the shaft 19.

Figure 4:
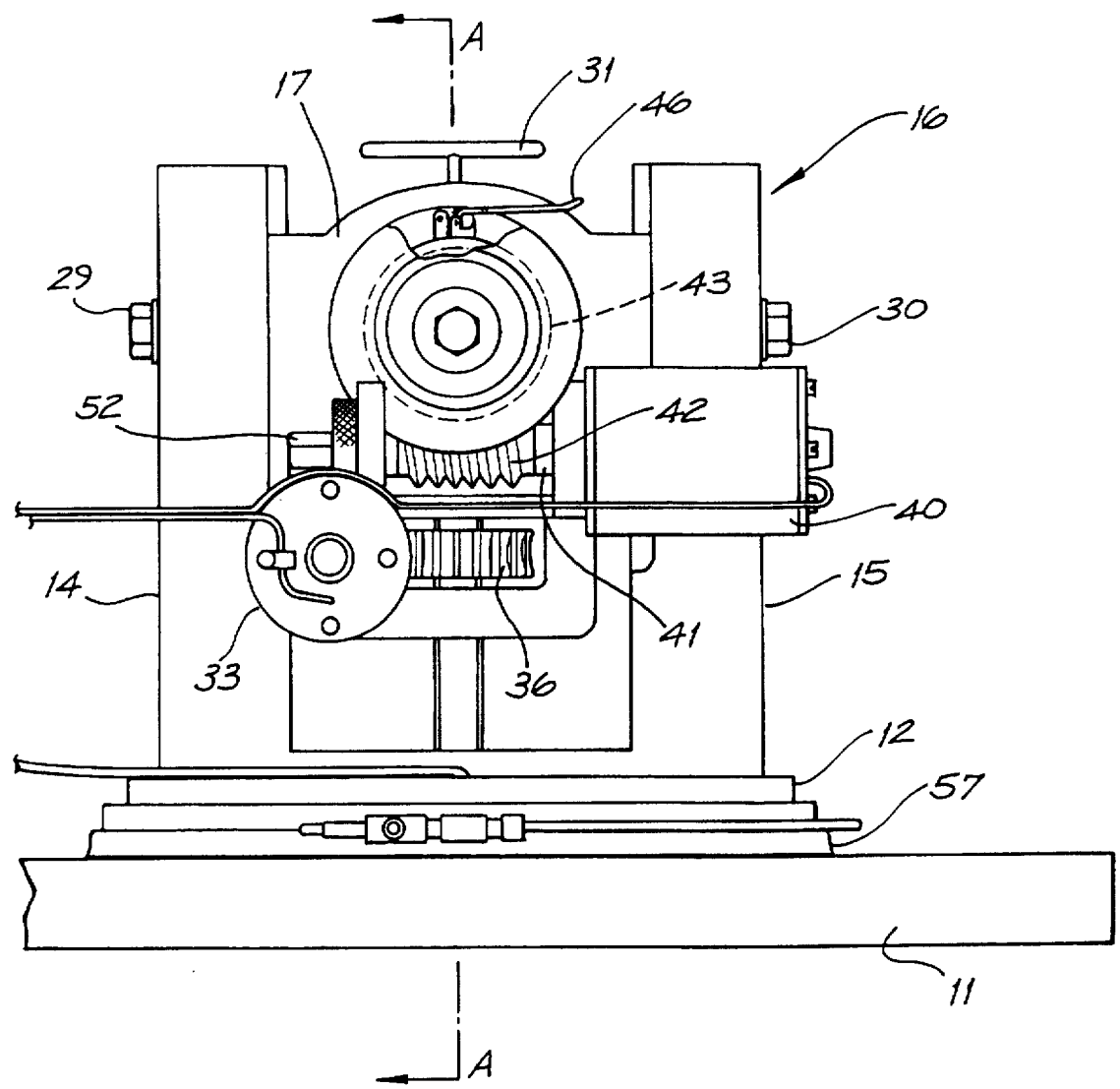
FIG. 4 is a front elevational view of the jig shown in FIG. 1.

The shaft 19 can be manually rotated by means of the manual adjustment knob 52 (see FIG. 4).

Figure 2:
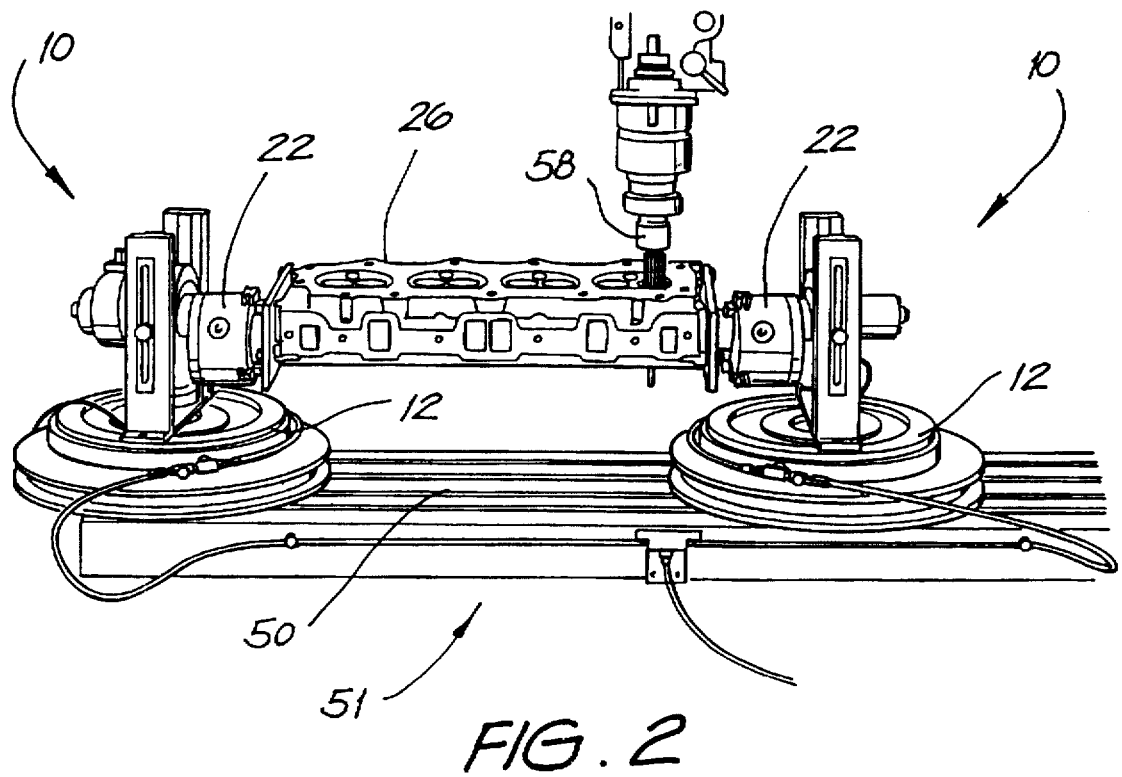
FIG. 2 is a perspective view of a pair of electro-pneumatic machining jigs according to the invention mounted on the bed of a milling machine and supporting a work-piece therebetween.
Figure 3:
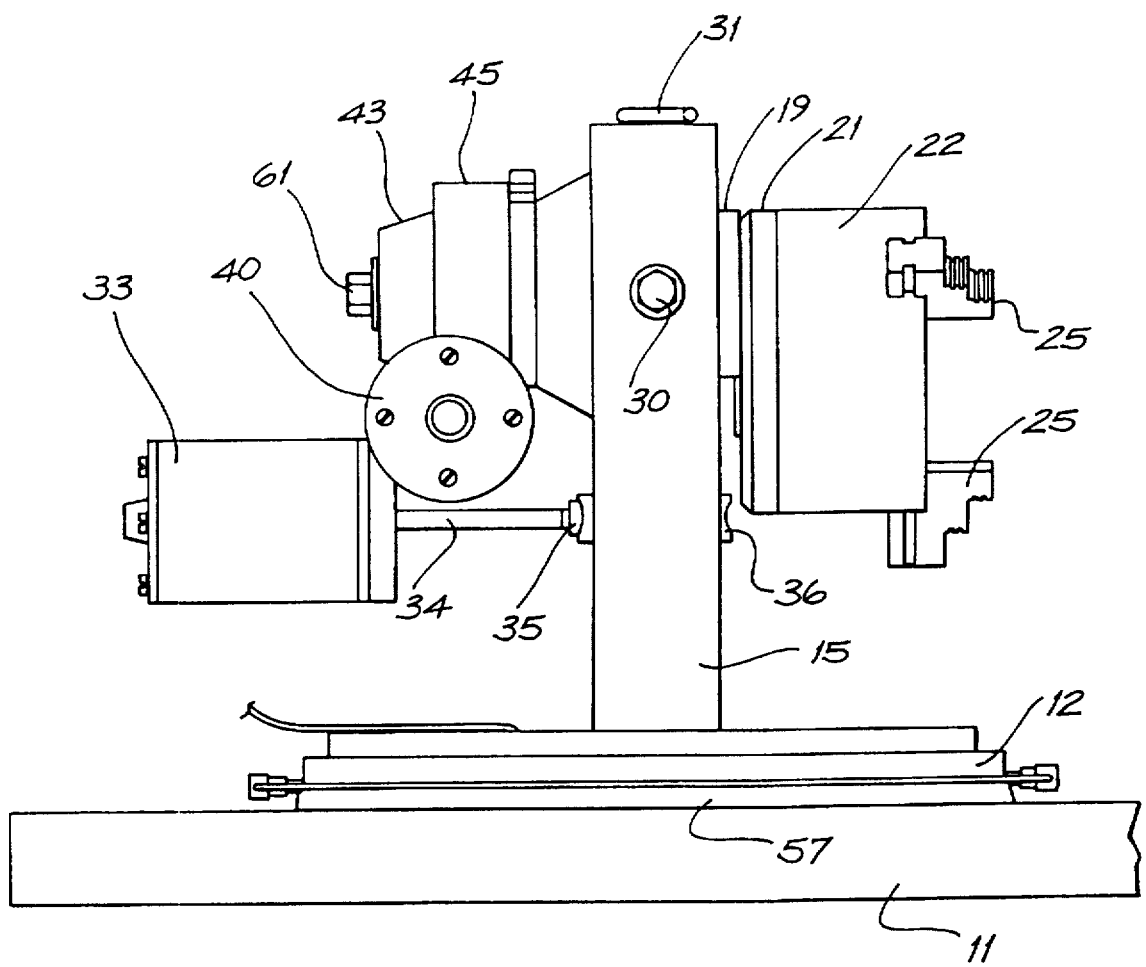
FIG. 3 is a side elevational view of the jig shown in FIG. 1.

Beneath the mounting plate 11 there is a keep plate 48 and screw 49 which receives a nut (not shown) to secure the mounting plate 11 to the bed 50 of a milling machine 51 (see FIG. 2).

The jig base 12 has, as mentioned above, an electro-magnetic coil 13 which is connected to electrical leads 53. The leads 53 are coupled to a source of electrical power through a switch operable to turn the electro-magnet on and off. The jig base 12 also has air lines 54 which are connected to air supply lines 55. Air flow is controlled by an on-off valve 56. The outlets of air lines 54 are directed at the mounting plate 11. A circumferential rubber wiper 57 extends around the periphery of the base 12 and engages against the mounting plate 11.

As can be seen in FIG. 2, the work-piece 26 is supported by a pair of similar jigs serving as jig stands 10. The right hand jig stand 10 does not require the worm drive rotational gearing (42,43). Both jig stands do, of course, require the height adjustment gearing (35,36). The height adjustment could be carried out manually without the use of electric motor 33 if desired. Likewise, the electric motor could be omitted.

As will be evident from the foregoing description, the invention consists basically of two jig stands 10 each having an air-float base 12 which has an embedded electro-magnet 13 which sits on top of a circular cast iron mounting plate 11. Above each air-float base 12 there is an adjustable holder arrangement which holds the work-piece 26 to be machined at variable angles. The work-piece 26 is positioned between the jig stands 10, and alignment beneath the tool head 58 is made with the bases 12 air "floating". Once the desired position is achieved, the air is turned off and the electro-magnets switched on. This clamps the two bases 12, and therefore the work-piece, in precisely the required position. The adjustable holder arrangement attached to each base is so designed that the clamped work-piece may be rotated about its longitudinal axis through 360° at variable longitudinal angles. Either end or both ends of the clamped work-piece may be raised or lowered with reference to the tool head 58 and the machine bed 50 upon which the jig is mounted, and therefore the height and angular disposition of the work-piece 26 may be varied through a range of angles in a longitudinal sense. This, in combination with the air-float arrangement, allows for rapid readjustments and realignments.

The length of work-piece that may be held in the jig is limited only by the length of the machine bed to which the jig is attached. However, mid-length support jacks may be needed to eliminate bowing in extremely long work-pieces. The weight of work-piece which the jig will support, with 80 psi of air pressure at the jig base for example, is at least 600 lbs. The width of work that may be fitted, while still maintaining 360° rollover capability, may be about 16". The angle to which a cylinder head of an automobile, for example, may be inclined to the horizontal (longitudinally) is at least 30°. Also, any such inclined cylinder head may still be able to be longitudinally rotated and be subject to air flotation for alignment with respect to the tool head.

On any cylinder head, including motor bike heads, the work that may be carried out in one setting up will cover valve seats being cut and inserts fitted, valve guide liners being machined and fitted, the manifold surface may be fly cut or ground, the head gasket joint face may be fly cut or ground, machining may be carried out for valve spring seats, and valve stem seals, ports and throats may be enlarged, as well as other actions taken. The jig may hold many other items such as exhaust and inlet manifolds for machining, crank shafts for cross-drilling, a lathe chuck and indexing head to enable the fly cutting of piston crowns, and many other items, as well as being applicable to applications outside the motor industry.

INDUSTRIAL APPLICABILITY

The electro-pneumatic machining jig of the invention may be used to locate a work-piece accurately with respect to the tool of a milling or other machine.

I claim:

1. An electro-pneumatic machining jig adapted to be attached to the bed of a machine such as a milling machine, grinding machine or the like, to hold a work-piece for machining, said machining jig having a pair of jig stands for holding the work-piece, said jig stands adapted to be mounted in selected spaced relationship on the bed of the machine, each said jig stand having work-piece connection means on an adjustable stand on a base having air-float means and electro-magnetic means, the air-float means permits alignment of the work-piece between the jig stands whilst the bases are floating and when the air-float is terminated, the electro-magnetic means are energised to clamp each jig stand to a mounting plate on the machine.

2. The electro-pneumatic machining jig as claimed in claim 1 wherein the electro-magnetic means is in the form of an electro-magnetic coil embedded within the base.

3. The electro-pneumatic maching jig according to claim 2 and including a shaft mounted on the adjustable stand to which the work piece is connected and further including means for rotating the shaft.

4. The electro-pneumatic machining jig as claimed in claim 1, and including a shaft mounted on the adjustable stand to which the work piece is connected and further including means for rotating the shaft.

5. The electro-pneumatic machining jig according to claim 4 including means for raising and lowering the shaft with respect to the base.

6. The electro-pneumatic machining jig according to claim 4 including a doubly truncated ball supported by the adjustable stand.

7. The electro-pneumatic machining jig according to claim 1 wherein the air-float means comprises an air flow path within each base having an inlet that is adapted to be coupled to a source of pressurised air and an outlet directed to the mounting plate.

8. The electro-pneumatic machining jig as claimed in claim 7, wherein the electro-magnetic means is in the form of an electro-magnetic coil embedded within the base.

9. The electro-pneumatic machining jig according to claim 7 and including a shaft mounted on the adjustable stand to which the work piece is connected and further including means for rotating the shaft.

* * * * *